(12) United States Patent
Li et al.

(10) Patent No.: US 9,059,812 B2
(45) Date of Patent: Jun. 16, 2015

(54) MICROTCA CARRIER, CLOCK CARD AND METHOD FOR PROVIDING A CLOCK

(75) Inventors: Shanfu Li, Shenzhen (CN); Feng Hong, Shenzhen (CN); Cheng Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1409 days.

(21) Appl. No.: 12/475,676

(22) Filed: Jun. 1, 2009

(65) Prior Publication Data
US 2010/0005333 A1    Jan. 7, 2010

Related U.S. Application Data

(63) Continuation of application No. PCT/CN2008/071829, filed on Jul. 31, 2008.

(30) Foreign Application Priority Data

Aug. 8, 2007   (CN) .......................... 2007 1 0029656

(51) Int. Cl.
   *G06F 1/12*   (2006.01)
   *H04J 3/06*   (2006.01)
(52) U.S. Cl.
   CPC ................................... *H04J 3/0688* (2013.01)
(58) Field of Classification Search
   USPC ........................... 710/313; 713/400, 500, 600
   See application file for complete search history.

(56) References Cited

U.S. PATENT DOCUMENTS

| 2005/0146363 | A1 | 7/2005 | Chunxu et al. |
| 2007/0124529 | A1 | 5/2007 | Carr et al. |
| 2008/0095292 | A1 | 4/2008 | Zhang |

FOREIGN PATENT DOCUMENTS

| CN | 1615031 A | 5/2005 |
| CN | 1655455 A | 8/2005 |
| CN | 1798018 A | 7/2006 |
| CN | 1889415 A | 1/2007 |
| WO | WO 2007/000111 A1 | 1/2007 |
| WO | WO 2007062236 A2 | 5/2007 |

OTHER PUBLICATIONS

Office Action from the State Intellectual Property Office of the PRC in corresponding Chinese Patent Application No. 200710029656.6 (Apr. 29, 2010).

(Continued)

*Primary Examiner* — Kim Huynh
*Assistant Examiner* — Paul J Yen
(74) *Attorney, Agent, or Firm* — Leydig, Voit & Mayer, Ltd.

(57) ABSTRACT

A MicroTCA system is disclosed that includes an MCH, a clock card connected with the MCH, and multiple AMCs. The clock card includes a clock selecting unit, configured to select and output a clock source and a phase-lock unit, configured to generate a system synchronization clock according to the clock source selected by the clock selecting unit of the clock card. The MCH includes a clock drive unit, configured to drive the system synchronization clock generated by the clock card to multiple AMCs connected with the MCH. A clock card, a cascaded MicroTCA carrier, and a method for providing a clock are also provided. In this way, the implementation of the MicroTCA clock system is simplified, and the whole configuration cost of multiple cascaded MicroTCA carriers is reduced.

5 Claims, 10 Drawing Sheets

(56) References Cited

OTHER PUBLICATIONS

Written Opinion from the International Searching Authority in International Application No. PCT/CN2008/071829 (Oct. 24, 2008).
PICMG® AMC.0 R2.0 Release Candidate RC1.2—Advanced Mezzanine Card Base Specification, Oct. 18, 2006, PCI Industrial Computer Manufacturers Group, Wakefield, Massachusetts.
PICMG® MicroTCA.0 Draft Specification Release Candidate 1.ORC2—Micro Telecommunications Computing Architecture Base Specification, Jun. 2, 2006, PCI Industrial Computer Manufacturers Group, Wakefield, Massachusetts.
PICMG, "Micro Telecommunications Computing Architecture Short Form Specification," MTCA.0 R1.0:1-34 (Sep. 2006).
"Micro Telecommunications Computing Architecture: Short Form Specification," PICMG MTCA.0 R1.0, Sep. 21, 2006, PICMG, Wakefield, MA.

| Port No | AMC Port area | Port use |
|---|---|---|
| TCLKA | Telecom Clocks | Telecom clock (to AMC, optionally from AMC [MCG*]) |
| TCLKB | | Telecom clock (from AMC, optionally to AMC [MCG*]) |
| TCLKC | | Telecom clock (to AMC optionally from AMC [MCG*]) |
| TCLKD | | Telecom clock (from AMC, optionally to AMC [MCG*]) |
| FCLK | Fabric Reference Clock | PCI-Ex 100MHz |
| 0 | Common options region | 1GbE_1 |
| 1 | | 1GbE_2 |
| 2 | | SAS/SATA_1 |
| 3 | | SAS/SATA_2 |
| 4 | Fat pipes region | Point-to-Point 1 Port 1 (PCIe_1) |
| 5 | | Point-to-Point 1 Port 2 (PCIe_2) |
| 6 | | Point-to-Point 1 Port 3 (PCIe_3) |
| 7 | | Point-to-Point 1 Port 4 (PCIe_4) |
| 8 | | Fabric 1 Port 1 (1GbE_3 / 1st XAUI/SRIO_1) |
| 9 | | Fabric 1 Port 2 (1GbE_4 / 1st XAUI/SRIO_2) |

FIG. 5

| | | |
|---|---|---|
| 10 | | Fabric 1 Port 3 |
| | | (1GbE_5 / 1st XAUI/SRIO_3) |
| 11 | | Fabric 1 Port 4 |
| | | (1GbE_6 / 1st XAUI/SRIO_4) |
| 12 | Extended options region | Point-to-Point 2 Port 1 |
| | | (AMC-AMC Point-to-Point_1 / Update channel_1 / RTM I/O_8) |
| 13 | | Point-to-Point 2 Port 2 |
| | | (AMC-AMC Point-to-Point_2 / RTM I/O_7) |
| 14 | | Point-to-Point 2 Port 3 |
| | | (AMC-AMC Point-to-Point_3 / RTM I/O_6) |
| 15 | | Point-to-Point 2 Port 4 |
| | | (AMC-AMC Point-to-Point_4 / RTM I/O_5) |
| 17 | | Fabric 2/RTM Port 4 |
| | | (2nd XAUI/SRIO_4 / RTM I/O_4) |
| 18 | | Fabric 2/RTM Port 3 |
| | | (2nd XAUI/SRIO_3 / RTM I/O_3) |
| 19 | | Fabric 2/RTM Port 2 |
| | | (2nd XAUI/SRIO_2 / RTM I/O_2) |
| 20 | | Fabric 2/RTM Port 1 |
| | | (2nd XAUI/SRIO_1 / RTM I/O_1) |

FIG. 5 (cont.)

MICROTCA CARRIER, CLOCK CARD AND METHOD FOR PROVIDING A CLOCK

CROSS-REFERENCE TO RELATED APPLICATIONS

This application is a continuation of International Patent Application No. PCT/CN2008/071829, filed Jul. 31, 2008, which claims priority to Chinese Patent Application No. 200710029656.6, filed Aug. 8, 2007, both of which are hereby incorporated by reference in their entirety.

FIELD OF THE INVENTION

The present invention relates to a Micro Telecommunications Computing Architecture (MicroTCA) carrier, clock card, and method for providing a clock.

BACKGROUND

The MicroTCA is a computer platform specifications formulated by the PCI Industrial Computers Manufacturers Group (PICMG). The MicroTCA uses standard Advanced Mezzanine Card (AMC) module to construct modularized communication platforms of low capacity and low cost, and is primarily applied to small telecom equipment of a central office or enterprise-class communication equipment. Currently, the latest version of the standard is PICMG MicroTCA.0 R1.0.

FIG. 1 shows a MicroTCA carrier structure in the conventional art. In a MicroTCA carrier, a carrier is composed of a frame, Power Module (PM), MicroTCA switching control module (such as MicroTCA Carrier Hub, MCH), and AMC. Several carriers and a Cooling Unit (CU) constitute a shelf. The MicroTCA in the conventional art is applicable to a cabinet which is 300 mm in depth, or placed in a cabinet 600 mm deep in the back-to-back mode.

FIG. 2 shows a structure of an MCH in the conventional art. The MCH is a switching control module of the MicroTCA carrier, and is the central node of the whole system. The MCH includes a MicroTCA Carrier Management Controller (MCMC) unit, data switching unit, clock unit, and Joint Test Action Group (JTAG) unit. The MCMC unit is a management module of the whole system, and primarily manages the AMC and PM. The IPMB-L is the connection for the MCH to manage the AMC, and the IPMB-0 is the connection for the MCH to manage the PM. The data switching unit is divided into seven switching interfaces which range from Fabric A to Fabric G, and provides data switching of at most 12 AMC cards. The clock unit implements the clock function of the system, including selecting a clock source, generating a system synchronization clock, and driving the generated system clock to each connected AMC card. The CLKx is configured to identify the clock type, and the JTAG unit is configured to perform the test function of the system.

The MicroTCA.0 R1.0 standard defines the maximum height of the MCH to be 6 HP (about 3 cm), which may be implemented through at most 4 Printed Circuit Boards (PCBs). That is, one MCH is composed of 4 PCBs, and the 4 PCBs of the MCH are limited to a 6-HP height. The first PCB enables the MCMC to manage the MicroTCA carrier, and provides the basic switching functions (Fabric A port). The second PCB is configured to implement the Fabric B port for system clock and data switching; the third and fourth PCBs provide Fabric C-to-Fabric G ports (namely, Fat Pipe) of Fabric switching on the data plane. Meanwhile, as defined in the standard, the connector between the MCH and the backplane is composed of 4 tongues, where tongue 1 provides a connection pin between the MCMC unit and JTAG unit, tongue 2 provides a connection pin of the clock unit, and tongue 3 and tongue 4 provide connection pins of the Fat Pipe (namely, ports from Fabric C to Fabric G).

FIG. 3 shows redundancy clock architecture of a MicroTCA carrier in the conventional art. In the MicroTCA.0 R1.0 standard in the conventional art, the MCH implements the clock functions. The MicroTCA system adopts a star clock topology. In the backplane, it is defined that an MCH slot is located at the central node of the star topology, and only the MCH can provide enough pins for connecting with other AMCs. Therefore, the clock module needs to be implemented on the MCH.

FIG. 4 shows implementation of a clock in a MicroTCA carrier in the conventional art. Like the traditional ATCA clock implementation solution, this implementation solution sets a clock module on the central node (namely, MCH) of the system. One clock module includes a clock source selecting unit, phase-lock unit, and clock drive unit. The clock source selecting unit is configured to select a clock source. The clock source refers to any clock source input to the clock module, for example, Global Positioning System (GPS) clock source, Building Integrated Timing Supply System (BITS) clock source, cascaded clock source from the upper stratum, or line clock source from the AMC. The phase-lock unit is configured to perform phase-lock synchronization for the selected clock source, and then obtain a system synchronization clock. The drive unit is configured to input the system synchronization clock into the connected AMC.

In a specific example, typically the MCH provides three types of clocks for the MicroTCA carrier. Clock 2 (CLK2) is one of the optional clock sources provided by each AMC for the clock module in the MCH. Clock 1 (CLK1) and clock 3 (CLK3) are active and standby system synchronization clocks provided by the clock module in the MCH for each AMC.

The clock sources input to the MCH include GPS clock, BITS clock, cascaded input clock, and AMC line clock. Universal input modes are as follows: GPS clock, cascaded input clock, and BITS clock are input through the interface provided by the panel, and the clock sources provided by each AMC are input through the backplane. Interlocking exists between the clock modules located on the active and standby MCHs. After phase-lock synchronization, the MCH outputs the system synchronization clock to each AMC.

FIG. 5 shows an AMC port configuration table in the conventional art. This configuration table is defined by the SCOPE organization, which defines the port assignment of the AMC in detail. This assignment scheme will be an important basis for port assignment in the next version of the AMC standard and MicroTCA standard. That is, the AMC port assignment shown in FIG. 5 will apply in formulating the AMC-related standards. The AMC may provide 4 communication clock channels, including two input clock ports (TCLKA, TCLKC), which receive the system synchronization clock from the active and standby MCHs, and two output clock ports (TCLKB, TCLKD), which provide line clock sources for the MCH. The AMC also provides 21 data ports: 4 public area ports (port 0-3), 8 Fat Pipe switching ports (Ports 4-11), and 9 extended area ports, where port 12 is configured to provide a data update channel through direct interconnection between AMCs.

FIG. 6 shows assignment of multi-frame cascaded clocks in a MicroTCA carrier in the conventional art. In the case of multi-frame cascading in the MicroTCA carrier, a clock module is set on the MCH of each carrier. FIG. 4 shows details of the clock module. In the case of multi-frame cascading, clock modules are also set on the MCH of the slave frame, and each such clock module is consistent with the clock module in the MCH of the master frame and also includes a clock source selecting unit, phase-lock and crystal oscillation unit, and drive unit, etc. In this case, the drive unit of the active MCH in the master frame outputs the system synchronization clock to the active MCH in each slave frame through cascaded connection. By analogy, the standby MCH in the master frame provides the system synchronization clock for the standby MCH in each slave frame.

In the process of implementing the present invention, the inventor finds that, in the conventional art, the clock system in practice involves the following defects because the clock module in the MicroTCA is implemented on the MCH, the MCH is limited to physical specifications, and switching, management and clock functions need to be implemented concurrently:

First, the MicroTCA standard defines the physical specifications of the MCH. Due to limitation of the physical space, the clock implementation is difficult. For example, if the required clock precision is enhanced stratum 3, the clock board requires the height of the constant-temperature crystal oscillator to be more than 1 cm, and at least two PCBs need to be deployed on the MCH. In order to implement clocks of enhanced stratum 3 or higher stratum, the physical size of the MCH specified in the standard is hardly accomplishable.

Moreover, in the case of multi-frame cascading, the configuration of the clock module in the slave frame is consistent with the configuration of the clock module in the master frame. In practice, however, some units (such as phase-lock unit) in the clock module of the slave frame may be left idle. Therefore, such configuration in the conventional art increases the system cost.

SUMMARY

A MicroTCA carrier, clock card, and method for providing a clock are provided according to embodiments of the present invention.

A MicroTCA carrier includes an MCH connected with more than one AMC, and a clock card connected with the MCH.

The clock card includes: (1) a first clock selecting unit, configured to select and output a first clock source; and (2) a phase-lock unit, configured to generate a system synchronization clock according to the first clock source selected by the first clock selecting unit.

The MCH includes a clock drive unit, configured to drive the system synchronization clock generated by the clock card to the plurality of AMCs connected with the MCH.

Accordingly, a cascaded MicroTCA clock system includes cascaded master-frame MicroTCA carriers, and at least one slave-frame MicroTCA carrier.

The master-frame MicroTCA carrier comprises at least one clock card. The clock card is configured to select a first clock source and generate a system synchronization clock. The master-frame MicroTCA carrier is configured to transfer the system synchronization clock to a slave-frame MicroTCA carrier.

The slave-frame MicroTCA carrier comprises at least one slave-frame MicroTCA Carrier Hub (MCH). The slave-frame MCH is configured to receive the system synchronization clock from the master-frame MicroTCA carrier, and drive the system synchronization clock to multiple slave-frame Advanced Mezzanine Cards (AMCs) connected with the MCH.

A clock card includes: (1) a clock selecting unit, configured to receive and select a clock source; and (2) a phase-lock unit, configured to generate and output a system synchronization clock according to the selected clock source.

A method for providing a clock in a MicroTCA carrier includes: (1) selecting, by a clock card, a first clock source and generating a system synchronization clock according to the selected first clock source; and (2) driving, by a MicroTCA Carrier Hub (MCH), the system synchronization clock generated by the clock card to an Advanced Mezzanine Card (AMC).

In summary, the embodiments of the present invention set a clock card in the MicroTCA carrier, and use the clock selecting unit and the phase-lock unit in the clock card to select a clock source and generate a system synchronization clock. Also, through the clock driving unit in the MCH, drive the system synchronization clock generated by the clock card to the AMCs connected with the MCH. In this way, the clock of the MicroTCA carrier is implemented, the implementation of the MicroTCA clock system is simplified, and a solution to a higher stratum of system synchronization clock is provided.

Moreover, if multiple MicroTCA carriers are cascaded, a clock card in the master-frame MicroTCA carrier selects a clock source, and generates a system synchronization clock. The slave-frame MCH in the slave-frame MicroTCA carrier receives the system synchronization clock generated by the master-frame MicroTCA carrier, and drives it to the slave-frame AMC in the slave-frame MicroTCA carrier directly. In this way, the clock of the MicroTCA carrier is implemented, the slave-frame MicroTCA carrier dispenses with the stand-alone apparatus for generating a system synchronization clock, and the whole configuration cost of the clock is reduced.

BRIEF DESCRIPTION OF THE DRAWINGS

FIG. 5 is an AMC port configuration table;

DETAILED DESCRIPTION

In order to make the technical solution, objectives, and merits of the present invention clearer, the present invention is hereinafter described in detail with reference to accompanying drawings and preferred embodiments.

Figure 1:
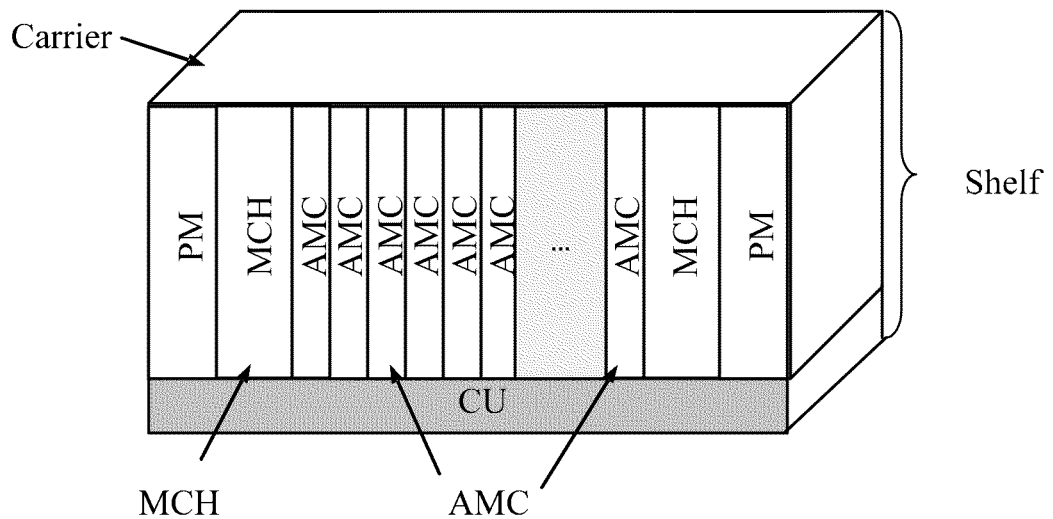
FIG. 1 shows a MicroTCA carrier structure.
Figure 2:
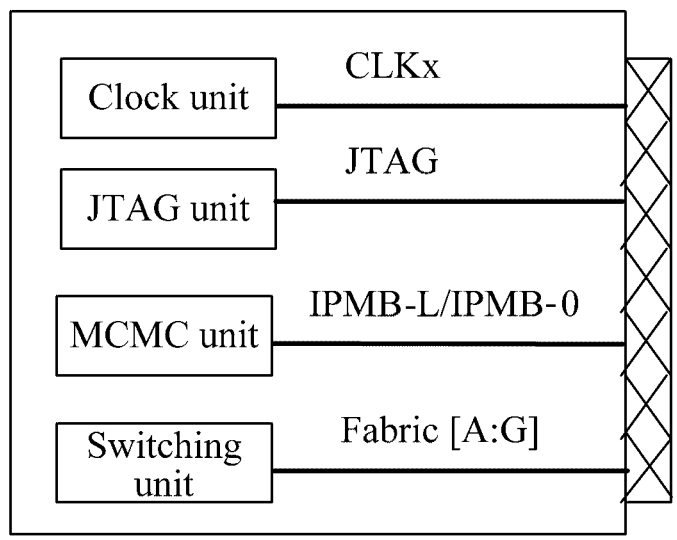
FIG. 2 shows an MCH structure.
Figure 3:
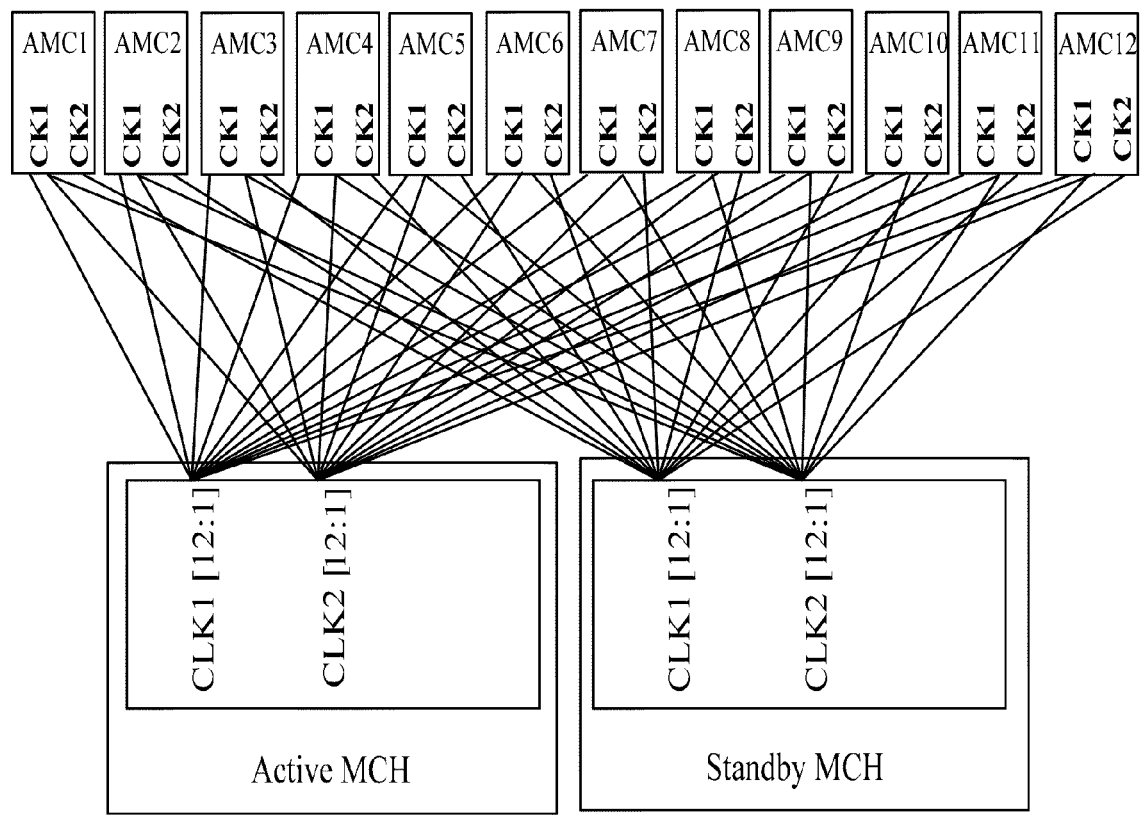
FIG. 3 shows the redundancy clock architecture of a MicroTCA carrier.
Figure 4:
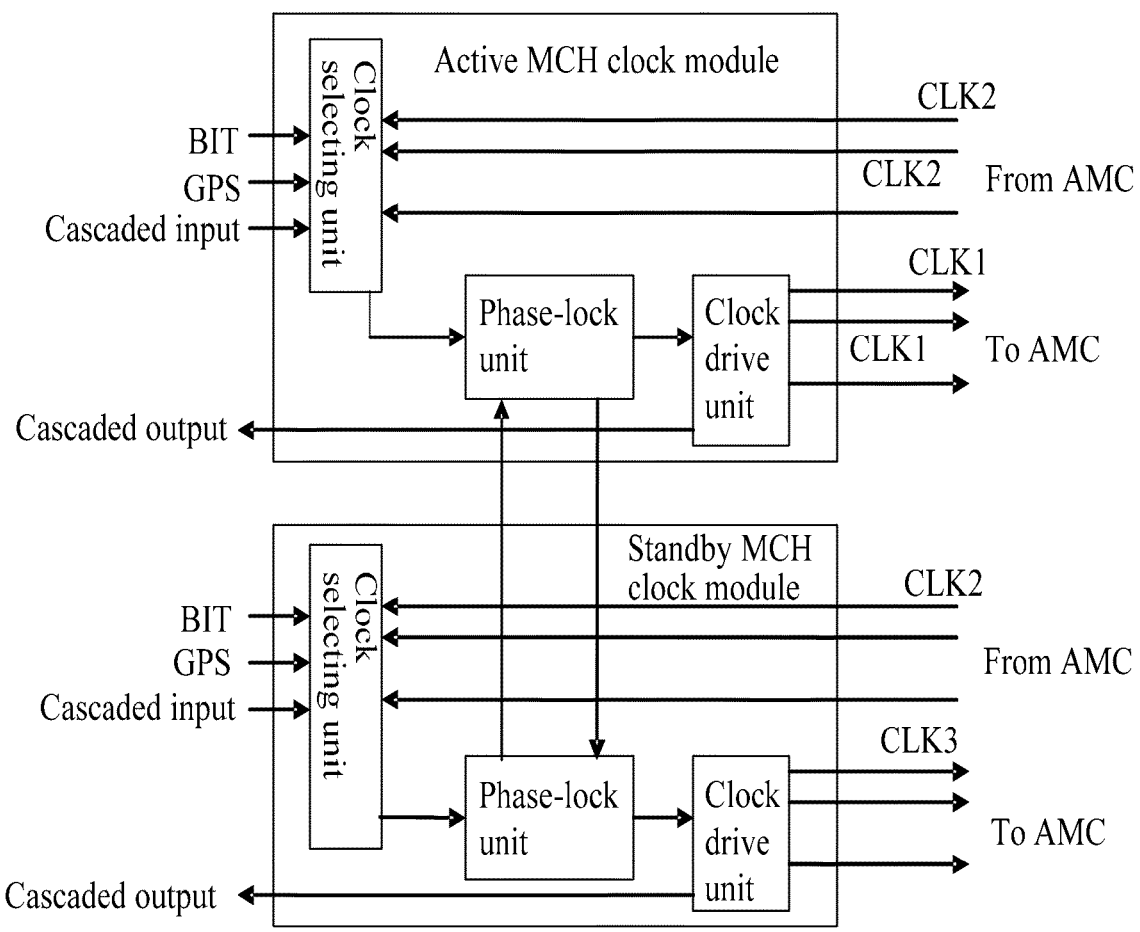
FIG. 4 shows implementation of a clock module in a MicroTCA carrier.
Figure 6:
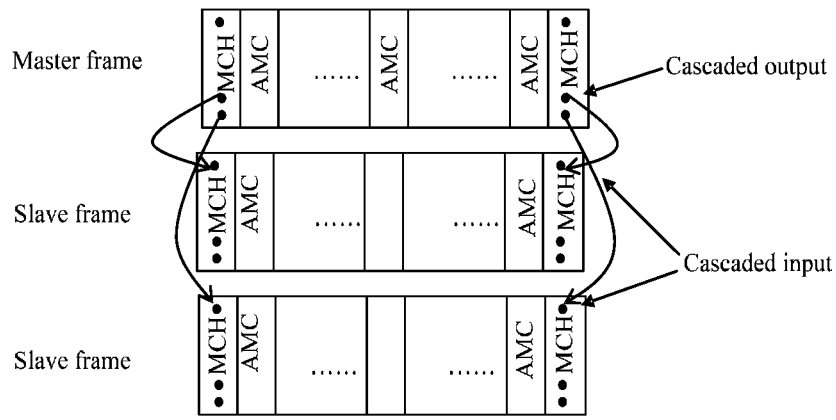
FIG. 6 shows assignment of multi-frame cascaded clocks in a MicroTCA carrier.
Figure 7:
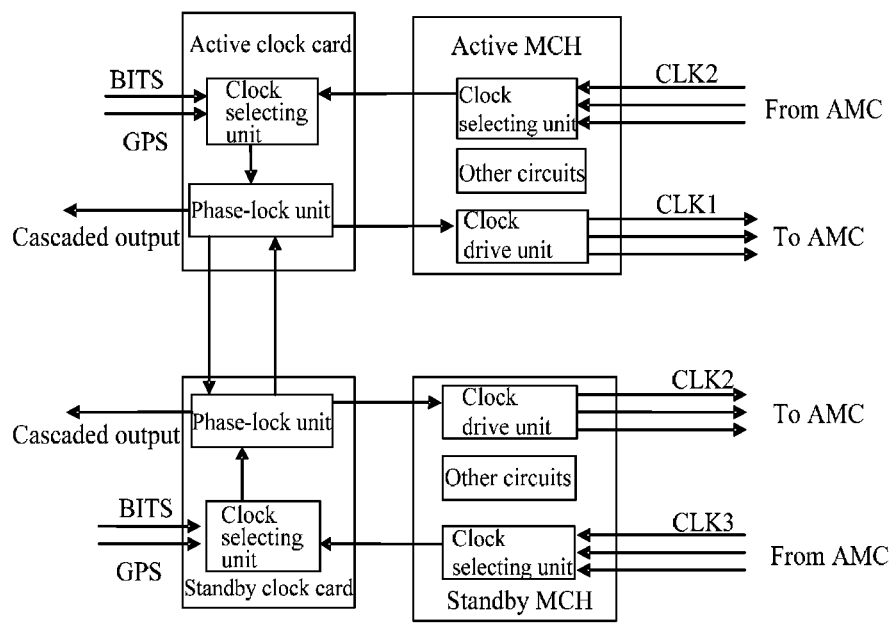
FIG. 7 shows clock assignment of a MicroTCA carrier according to an embodiment of the present invention.

FIG. 7 shows a MicroTCA carrier according to an embodiment of the present invention. In an embodiment of the present invention, partial function units of the clock module are separated from the MCH, and a stand-alone clock card is configured in the MicroTCA carrier.

The MicroTCA clock system includes an active MCH, standby MCH, two redundant clock cards, and other AMCs. The active MCH is connected with a clock card (active clock card), and the standby MCH is connected with another clock card (standby clock card). The two clock cards may be synchronized through phase locking.

The active MCH and the standby MCH are still in the central node location of the star topology of the system, and can communicate clock signals with the AMC.

An MCH includes: (1) a clock selecting unit, configured to receive and select an external clock source, or receive signals of an AMC card line clock source from the AMC card, and send the selected clock source into the clock card, where the external clock source is a clock source such as BITS clock source and GPS clock source; (2) a clock drive unit, configured to receive the system synchronization clock signals generated by the clock card, and drive the system synchronization clock to each AMC; and (3) other circuits such as a switching unit, MCMC unit, and JTAG unit, as illustrated in FIG. 1 to FIG. 5.

A clock card includes: (1) a clock selecting unit, configured to receive and select an external clock, or receive a selected clock source from the active or standby MCH, where the external clock source is a clock source such as BITS clock source and GPS clock source; and (2) a phase-lock unit, configured to obtain a system synchronization clock after performing phase-lock synchronization for the clock source selected by the clock selecting unit of the clock card, where the system synchronization clock is transferred to the clock drive unit of the active or standby MCH.

In the embodiments of the present invention, the clock functions of the MicroTCA carrier are implemented on the MCH and clock card respectively. Therefore, some high-precision clock unit such as GPS card and a constant-temperature crystal oscillator of enhanced stratum-3 clock may be implemented on the clock card, without being restricted to physical specifications (the physical width of the AMC is also up to 6 HP, namely, about 3 cm), and interlocking is practicable between two clock cards.

The clock card slot of the MicroTCA carrier is compatible with the AMC. If the carrier needs no configuration of clock cards, the clock card slot may hold an AMC.

In other embodiments, the MicroTCA clock system may be not in the active-standby redundancy structure, namely, the MicroTCA clock system includes an MCH, a clock card, and other AMCs. This MCH is connected with the clock card and all AMCs. The principles are similar to illustration of FIG. 7.

The method of providing a clock in a MicroTCA carrier according to an embodiment of the present invention includes: (1) receiving and selecting, by an MCH, an external clock source or a line clock source from the AMC, and transferring the selected clock source to the clock card; (2) selecting, by the clock card, a clock source from the MCH or an external clock source, generating a system synchronization clock source according to the selected clock source, and transferring the system synchronization clock source to the MCH; and (3) driving, by the MCH, the system synchronization clock source to each AMC connected with the MCH.

Moreover, if the MicroTCA carrier has a cascaded master frame or slave frame structure, the MCH or clock card in the master frame transfers the system synchronization clock generated by the clock card to the MCH in the slave frame through a cascaded output interface, as detailed hereinafter.

The following embodiments suppose that the MicroTCA clock system has an active-standby redundancy structure. The MicroTCA clock system without any active-standby redundancy structure is not described here any further.

Figure 8:
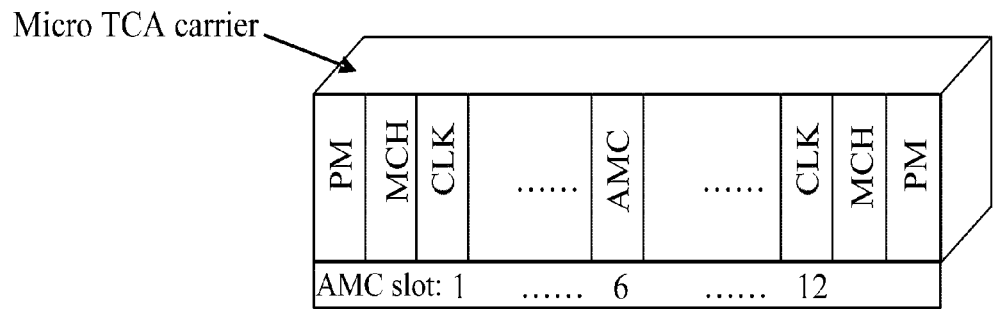
FIG. 8 shows a structure of a MicroTCA carrier according to an embodiment of the present invention.
Figure 9:
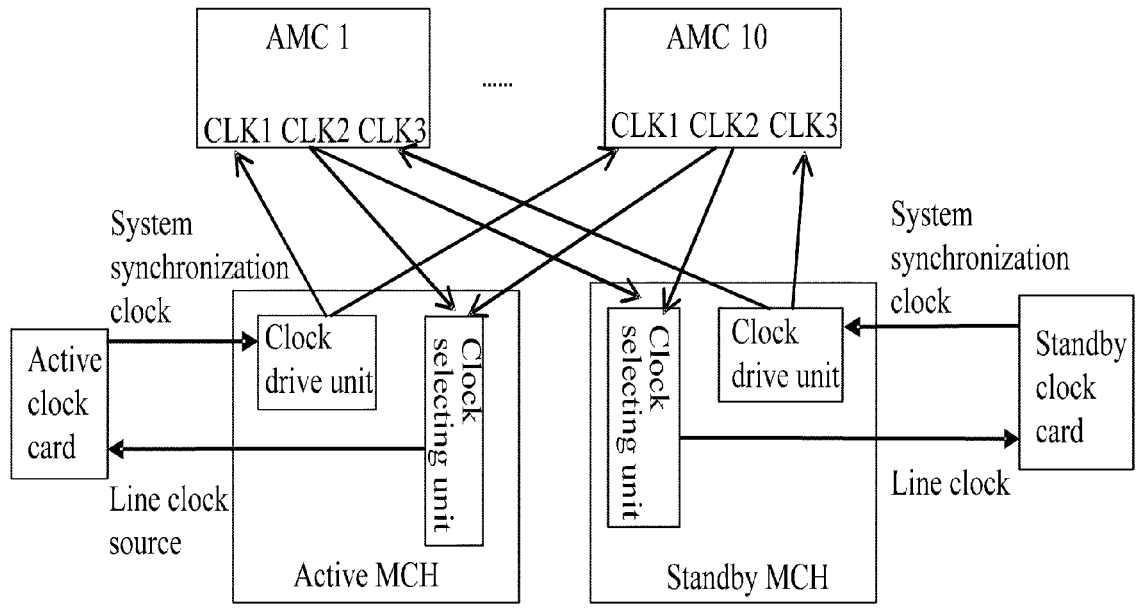
FIG. 9 shows more detailed connection of the MicroTCA carrier illustrated in FIG. 8.

FIG. 8 shows a MicroTCA carrier structure according to an embodiment of the present invention. FIG. 9 shows more detailed connections of the components illustrated in FIG. 8. In this embodiment, the configuration of the MicroTCA carrier includes: two MCHs (one active MCH and one standby MCH), two PMs, two clock cards (one active clock card and one standby clock card), and 10 AMCs. The clock cards are set in slot 1 and slot 12 of the MicroTCA carrier, the remaining 10 AMCs are set in slots 2 to 11 of the MicroTCA carrier consecutively, the active MCH and standby MCH are connected with each AMC, the active MCH is connected with the active clock card, and the standby MCH is connected with the standby clock card. The system provides three types of clocks. The active MCH and standby MCH provide the system synchronization clocks for each AMC through the clocks CLK1 and CLK3 respectively. Each AMC provides a line clock source of each AMC for the MCH through the CLK2, where each AMC provides the line clock source for the active MCH and standby MCH concurrently.

Figure 10:
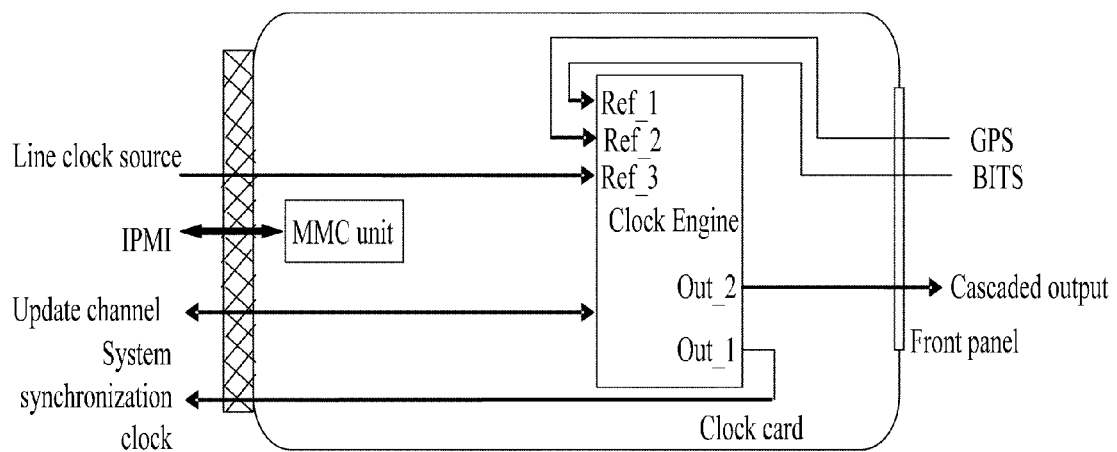
FIG. 10 shows a structure of a clock card illustrated in FIG. 9.

FIG. 10 shows a structure of the clock card illustrated in FIG. 9. The Module Management Controller (MMC) unit provides management for the clock card, and receives the management from the MCH. The clock engine includes a phase-lock unit and clock selecting unit shown in FIG. 7. Three types of clock sources are line clock source, GPS clock source, and BITS clock source from the MCH respectively. The line clock source occupies the TCLKA port illustrated in FIG. 5, and the GPS clock source and BITS clock source use the front panel of the clock card to provide interfaces. The clock interlock channel of the redundant clock card is provided by the update channel (namely, port 12) between the AMCs in FIG. 5. The cascaded output interface for the system synchronization clock generated by the cascaded output clock card is provided by the front panel. In other embodiments, this cascaded output interface may also be set on the MCH.

The definition of the management port of the clock card is consistent with the definition in the AMC.0 R2.0 specifications. The system synchronization clock generated by the clock card is connected with the MCH through the TCLKB port of the AMC in FIG. 5. The clock drive unit of the MCH provides the system synchronization clock for each AMC connected with the MCH in the MicroTCA carrier.

As against the AMC.0 standard, the clock card is modified to a very small extent with respect to port application. That is, the clock interlock channel between the redundant clock cards occupies the data update channel defined in the standard, and other ports are still consistent with those defined in the AMC standard. When the configuration of the MicroTCA carrier requires no clock card, slot 1 and slot 12 may hold the AMC directly. For the system, the configuration mode is more flexible, and the compatibility of various AMCs is maintained effectively.

Figure 11:
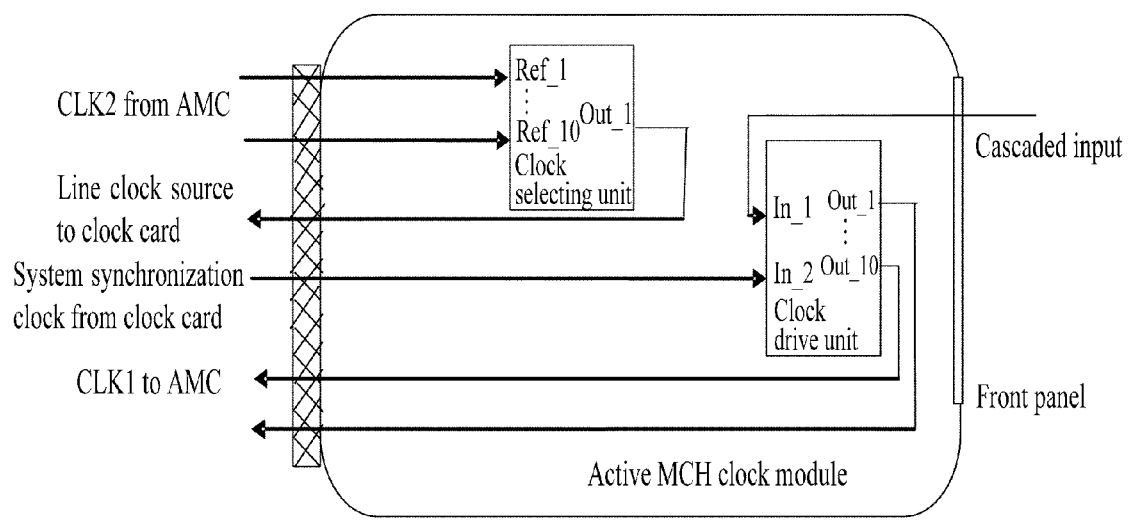
FIG. 11 shows a clock module of an active MCH illustrated in FIG. 9.

FIG. 11 shows a clock module of an active MCH illustrated in FIG. 9.

The MicroTCA.0 R1.0 defines the clock interface between the MCH and each AMC. The MCH is connected with the AMC through tongue 2 of the MCH. In this embodiment, for the MCH, the assignment of the clock port remains unmodified. The line clock source is selected through the clock selecting unit and the system synchronization clock is driven through the clock drive unit on the MCH. In this embodiment, the clock function module of the MCH is simplified, but the clock port provided by the MCH remains unchanged.

In FIG. 11, the interfaces of (which range from Ref_1 to Ref_10) the selecting modules in the MCH configured to receive the line clock sources from 10 AMCs, and Out_1 is the interface configured to provide the line clock source by the MCH for the clock card. There are two input interfaces in the clock drive unit. In_1 is a cascaded clock input interface, and In_2 is an input interface of the system synchronization clock generated by the clock card. When the MCH is in the master frame, the MCH does not need to receive the cascaded input clock, and needs to receive only the system synchronization clock of the clock card and drive the system synchronization clock to the 10 AMCs connected with the MCH in the master frame. When the MCH is in the slave frame, no clock card exists in the slave frame. In this case, the MCH needs to select and receive the cascaded input clock, and drive the cascaded input clock into the 10 AMCs connected with the MCH in the slave frame.

Figure 12:
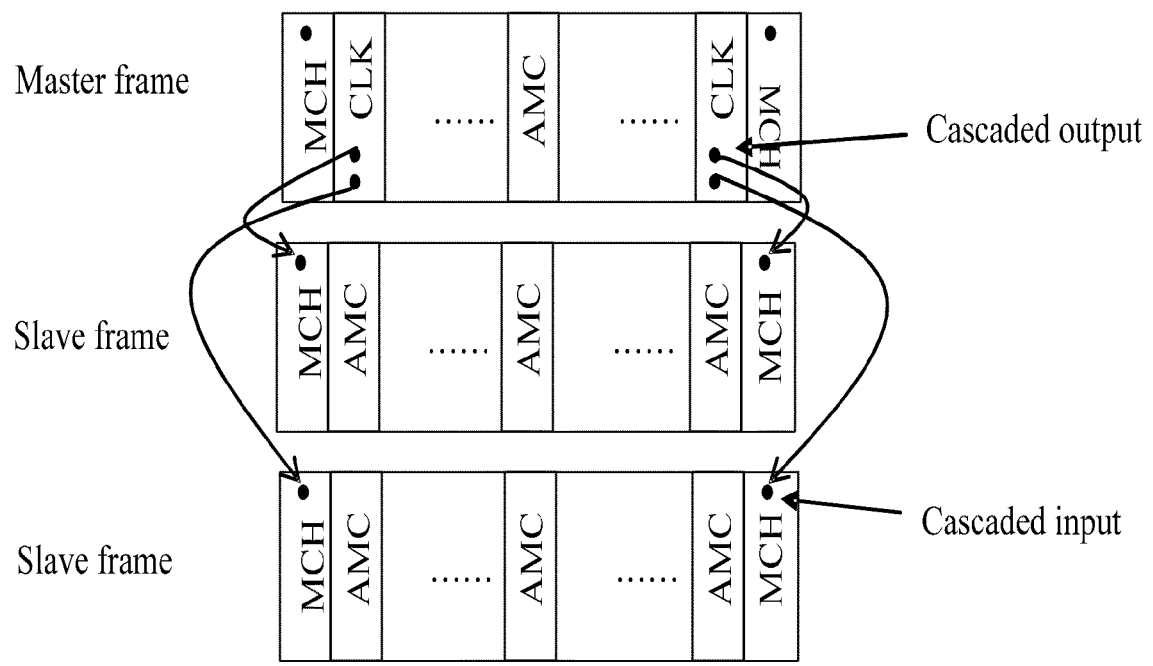
FIG. 12 shows assignment of multi-frame cascaded clocks in a MicroTCA carrier according to an embodiment of the present invention.
Figure 13:
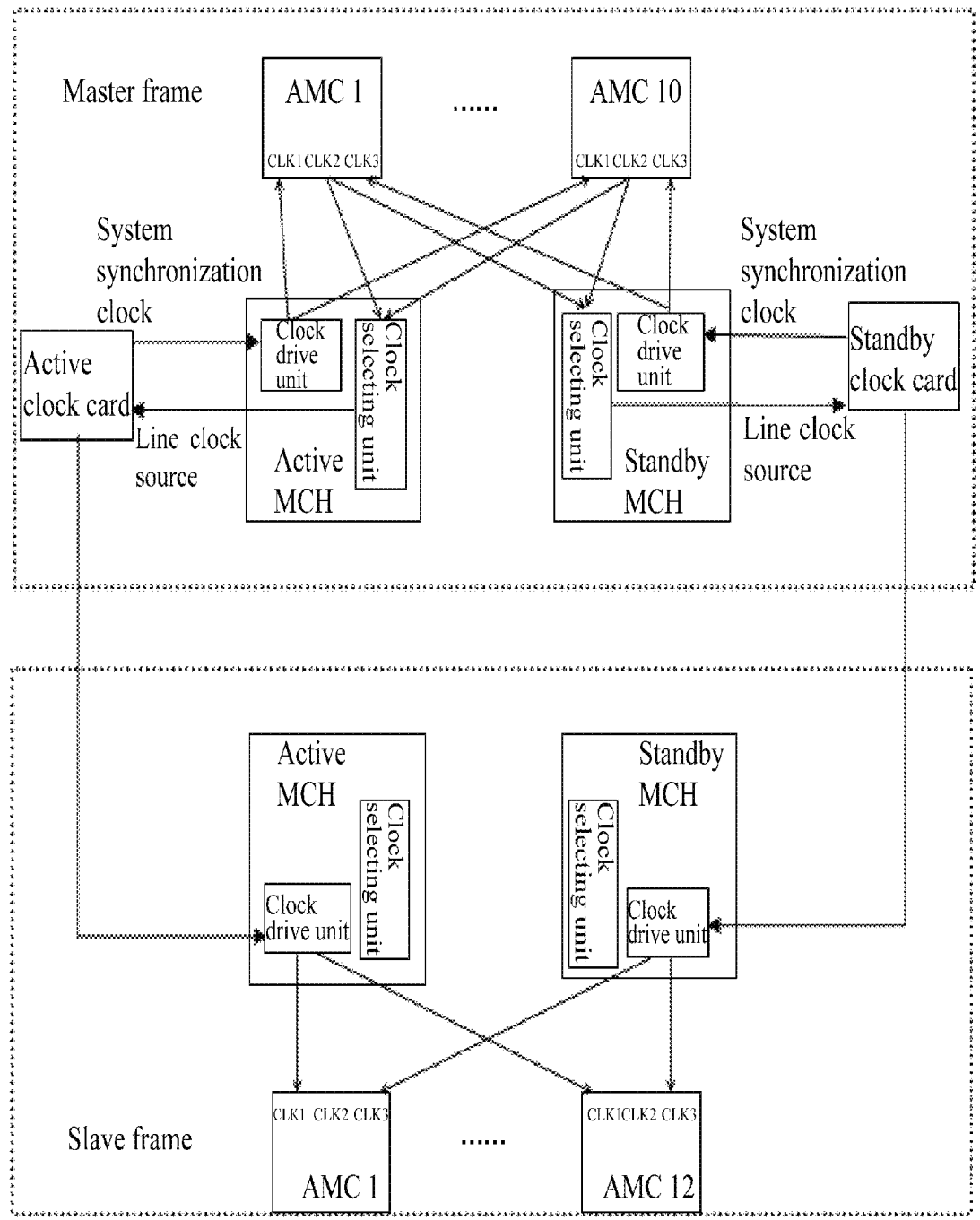
FIG. 13 shows more details of assignment of multi-frame cascaded clocks according to a MicroTCA carrier illustrated in FIG. 12.

FIG. 12 shows assignment of multi-frame cascaded clocks in a MicroTCA carrier according to an embodiment of the present invention, and FIG. 13 shows more details.

When the system requires multi-frame cascading, it may be necessary to set a clock card in the master-frame MicroTCA carrier (hereinafter referred to as "master frame"), and no clock card needs to be set in the slave-frame MicroTCA carrier (hereinafter referred to as "slave frame"). Moreover, the MCH is set in both master and slave frames, respectively called "master-frame MCH" and "slave-frame MCH" below. The clock card in the master frame selects a clock source (including an external clock source or a line clock source of the AMC), generates a system synchronization clock according to the selected clock source, and transfers the system synchronization clock to the slave-frame MCH in the slave frame. The slave-frame MCH drives the received system synchronization clock to each slave-frame AMC connected with the slave-frame MCH.

The clock card in the master frame is connected with the master-frame MCH through a backplane, and the clock card may be connected with the slave-frame MCH in the slave frame through cables.

The cascaded MicroTCA carrier needs two clock cards only in the master frame, and the master-frame MCH in each MicroTCA carrier needs configuration of only simple clock units, primarily including a clock selecting unit and a clock drive unit (as illustrated in FIG. 7). The clock card in the master frame provides a cascaded output interface of the system synchronization clock through a panel, and is connected with the cascaded input interface of the slave-frame MCH through cables, and then drives the system synchronization clock to each AMC in the slave frame through the clock drive unit of the slave-frame MCH. The AMC in the slave frame does not need to provide clock sources for the slave-frame MCH in the frame. Therefore, the AMC card in the slave frame does not need to provide connection of the CLK2. As against the clock cascading mode in the conventional art, the present disclosure dispenses with the phase-lock unit of the clock in the slave-frame MicroTCA carrier, thus reducing the cost of the cascaded system. Meanwhile, the cascaded output port of the system synchronization clock is set on the clock card, thus reducing the lead-out cable density of the master-frame MCH panel. In other embodiments, the cascaded output interface of the clock may also be set on the panel of the master-frame MCH, the clock card provides a cascaded clock for the master-frame MCH through the clock port TCLKD, and the master-frame MCH provides the system synchronization clock for the slave-frame MCH through the cascaded output interface.

Through the MicroTCA carrier, cascaded MicroTCA carrier, clock card, and the method for providing a clock according to the embodiments of the present invention, a clock selecting unit and phase-lock unit in the clock card set in the MicroTCA carrier select a clock source and generate a system synchronization clock, and a clock drive unit set in the MCH drives the system synchronization clock generated by the clock card to the AMC connected with the MCH, thus implementing the clock of the MicroTCA carrier. In this way, the implementation of the MicroTCA clock system is simplified, and a solution to a higher stratum (for example, enhanced stratum 3, or higher stratum) of system synchronization clock is provided.

Moreover, if multiple MicroTCA carriers are cascaded, a clock card in the master-frame MicroTCA carrier selects a clock source and generates a system synchronization clock. The slave-frame MCH in the slave-frame MicroTCA carrier receives the system synchronization clock generated by the master-frame MicroTCA carrier, and drives the system synchronization clock to the slave-frame AMC in the slave-frame MicroTCA carrier directly. In this way, the clock of the MicroTCA carrier is implemented, the slave-frame MicroTCA carrier dispenses with the stand-alone apparatus for generating a system synchronization clock, and the whole configuration cost of the clock is reduced.

It is evident to those skilled in the art that the present invention may be implemented through software in addition to a necessary hardware platform, or through hardware alone. Therefore, part or all of the contributions made by the technical solution under the present invention to the conventional art may be embodied by a software product. The software product may be stored in a storage medium (for example, ROM/RAM, magnetic disk, and compact disk) and incorporates several instructions which instruct a computer device (for example, PC, server, or network device) to execute the method provided by each embodiment of the present invention or part of the embodiment.

Although the invention has been described through preferred embodiments, the invention is not limited to such embodiments. It is apparent that those skilled in the art can make various modifications and variations to the invention without departing from the spirit and scope of the invention. The present invention is intended to cover such modifications and variations provided that they fall in the scope of protection defined by the following claims or their equivalents.

What is claimed is:

1. A cascaded Micro Telecommunications Computing Architecture (MicroTCA) carrier, comprising:
  cascaded MicroTCA carriers including at least one master-frame Micro TCA carrier and at least one slave-frame MicroTCA carrier, wherein the at least one master-frame MicroTCA carrier includes:
    a clock card comprising a first clock selecting unit for selecting and outputting a first clock source, and a phase-lock unit for generating a system synchronization clock according to the first clock source selected by the first clock selecting unit;
    a Micro TCA Carrier Hub (MCH) connected with a plurality of Advanced Mezzanine Cards (AMCs) and the clock card, comprising a clock drive unit for driving the system synchronization clock generated by the clock card to the plurality of AMCs connected with the MCH, a slot, which is configured to fix the clock card, and achieve electrical communication between the clock card and the MCH, wherein the MCH further comprises a second clock selecting unit, configured to receive AMC line clock sources from the AMCs connected with the MCH, select a second clock source from the AMC line clock sources, and send the selected second clock source to the clock card, wherein the clock card is configured to select the first clock source from the second clock source and at least one external clock source, and wherein:

the at least one master-frame MicroTCA carrier transfers the system synchronization clock to the at least one slave-frame MicroTCA carrier; and the at least one slave-frame MicroTCA carrier comprises at least one slave-frame MCH configured to receive the system synchronization clock from the at least one master-frame MicroTCA carrier, and drive the system synchronization clock to multiple slave-frame AMCs connected with the at least one slave-frame MCH.

2. The MicroTCA carrier of claim 1, wherein the at least one external clock source includes a Building Integrated Timing Supply System (BITS) clock source and a Global Positioning System (GPS) clock source.

3. The MicroTCA carrier of claim 1, wherein the at least one master-frame MicroTCA carrier further comprises at least one standby MCH and at least one standby clock card, the standby MCH is connected with the standby clock card, and the clock card and the standby clock card is synchronized through phase locking.

4. The carrier of claim 1, wherein the at least one master-frame MicroTCA carrier further comprises:

a master-frame MCH, configured to receive and select the second clock source, transfer the selected second clock source to the clock card, receive the system synchronization clock generated by the clock card, and drive the system synchronization clock to each master-frame AMC connected with the master-frame MCH.

5. The carrier of claim 1, wherein:

one of the clock card and the master-frame MCH has a cascaded output interface for outputting the system synchronization clock in a cascading way; and the slave-frame MCH has a cascaded input interface for receiving the system synchronization clock.

\* \* \* \* \*